United States Patent [19]

Perlini

[11] Patent Number: 4,660,851
[45] Date of Patent: Apr. 28, 1987

[54] ANCHORING SYSTEM FOR VEHICLE AXLES

[76] Inventor: Roberto Perlini, 37047 San Bonifacio, Locara (Verona), Italy

[21] Appl. No.: 788,488

[22] Filed: Oct. 17, 1985

[30] Foreign Application Priority Data

Nov. 5, 1984 [IT] Italy .................. 68100 A/84

[51] Int. Cl.$^4$ ............................................. B60G 17/04
[52] U.S. Cl. ........................................ 280/673; 280/724
[58] Field of Search ............... 280/673, 672, 671, 670, 280/660, 96.1, 704, 711, 724

[56] References Cited

U.S. PATENT DOCUMENTS 3,163,443 12/1964 Hickman ........................ 280/724
4,220,352 9/1980 Umeda et al. .................. 280/724

FOREIGN PATENT DOCUMENTS 691757 10/1930 France ............................ 280/724
448232 3/1949 Italy ................................ 280/724
580691 8/1958 Italy ................................ 280/672

Primary Examiner—John J. Love
Assistant Examiner—Ross Weaver

[57] ABSTRACT

Rigid axles are anchored to the chassis of vehicles, provided with vertically movable suspensions secured to the chassis, by means of a reduced number of separate connection elements reacting to longitudinal thrust and braking torque, and by the use of rotary translating joints which, when appropriately combined, absorb the transverse thrust and permit all the movements required for the axle for its articulation. For each axle at least one of such joints is secured on one side to the base of the suspension and, on the other side, to the axle. The joint is constituted substantially by a rotatable pin coupled either to a rotary translating sleeve or to a fork rotating on a pin of the axle.

9 Claims, 20 Drawing Figures

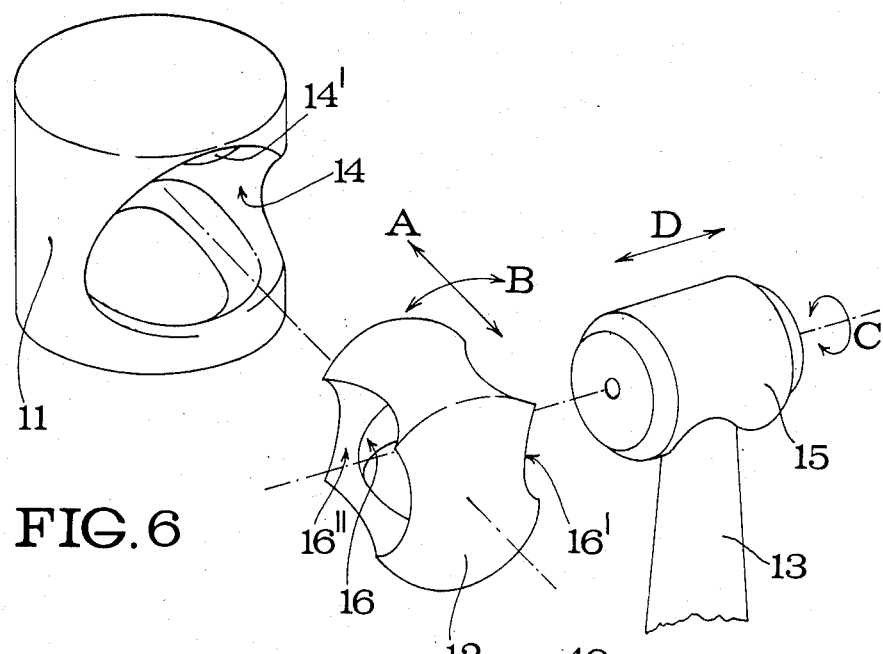
FIG. 6
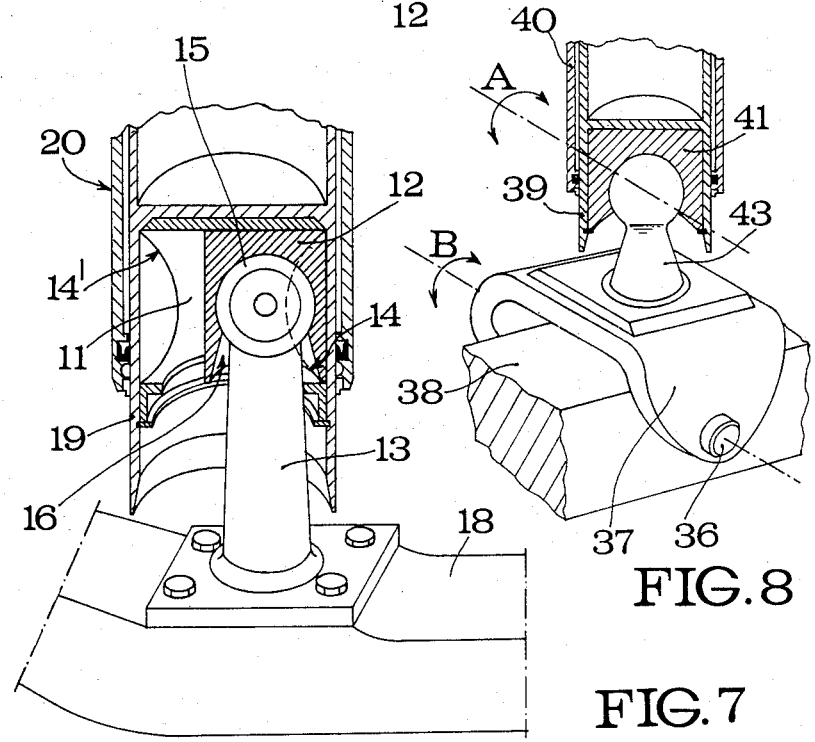
FIG. 7
FIG. 8

ANCHORING SYSTEM FOR VEHICLE AXLES

BACKGROUND OF THE INVENTION

This invention relates to an anchoring system for the axles of vehicles with vertically movable suspensions using rotary translating joints. More particularly, the invention relates to an anchoring system for anchoring rigid axles to the chassis of motor vehicles or more generally vehicles provided with vertically movable suspensions rigidly secured to the chassis, by the use of joints with a rotary translating movement.

It is known that in suspensions for rigid axles using resilient elements having a vertical path of movement (helical springs, air springs, hydraulic air and the like springs) longitudinal and transverse thrust is absorbed by separate members of connection between the axle and the chassis of the vehicle, which members are constituted by articulated systems of arms and reaction rods. The terms "transverse" and "longitudinal" as used in the present specification are intended to refer to the driving direction of the vehicle.

In the case of the suspensions normally mounted on truck vehicles, said articulated systems of connection between the rigid axle and the chassis comprise a plurality of longitudinal rods associated with a rigid transverse bar (of the Panhard type) or a Panhard bar associated with a triangular drawbar with its base firmly connected to the axle and the top pivotally connected to the chassis, or a plurality of longitudinal rods associated with a triangular drawbar having its top pivotally connected to the axle and the base to the chassis by means of a pin which absorbs the transverse thrust.

Therefore, in each case a complex system of separate members of connection between the axle and the chassis is required to absorb the transverse and longitudinal thrust to enable the suspension to maintain a strictly vertical path of movement.

As such systems comprise a considerable number of connection members and joints there are at present complicated mounting structures of considerable dimensions and weight and complex maintenance—just think of greasing the joints—and thus, after all, of high production and running costs.

It is an object of the present invention to eliminate or reduce the aforementioned disadvantages by providing a system of anchoring the rigid axle to the chassis, in which the basic elements are formed of connection joints between the vertically movable suspensions and the axle, so as to require the use of only a very reduced number of separating and connection members between the chassis and the axle and thus be of small dimensions and weight, easy maintenance and low production and running costs.

SUMMARY OF THE INVENTION

The above and other objects and advantages of the invention, which will become apparent from the following description, are achieved by an anchoring system for rigid axles of vehicles with vertically movable suspensions rigidly secured to the chassis of the vehicle, comprising connection elements between the rigid axle and the chassis, adapted to react to longitudinal thrust and to braking torque, characterized in that the vertically movable suspension is connected to said axle by at least one joint substantially constituted by a rotatable pin coupled to a rotary translating sleeve accommodated in a cylindrical seat at the base of said suspension.

BRIEF DESCRIPTION OF THE DRAWINGS

FIG. 6 is a perspective exploded view of a third embodiment of the joint according to the invention;

FIG. 7 is a perspective view, partly in section, of the joint of FIG. 6, connected to an axle and a vertically movable suspension;

FIG. 8 is a perspective view, partly in section, of a fourth embodiment of the joint according to the invention, connected to an axle and a vertically movable suspension;

DESCRIPTION OF PREFERRED EMBODIMENTS

According to the invention, rigid axles of vehicles provided with fixed suspensions are anchored to the chassis by using separate connection elements between the chassis and the axle, adapted to react to longitudinal thrust and the torque due to braking, and of rotary translating joints of connection between the suspension and the axle, which will be described in detail hereinafter.

Figure 1:
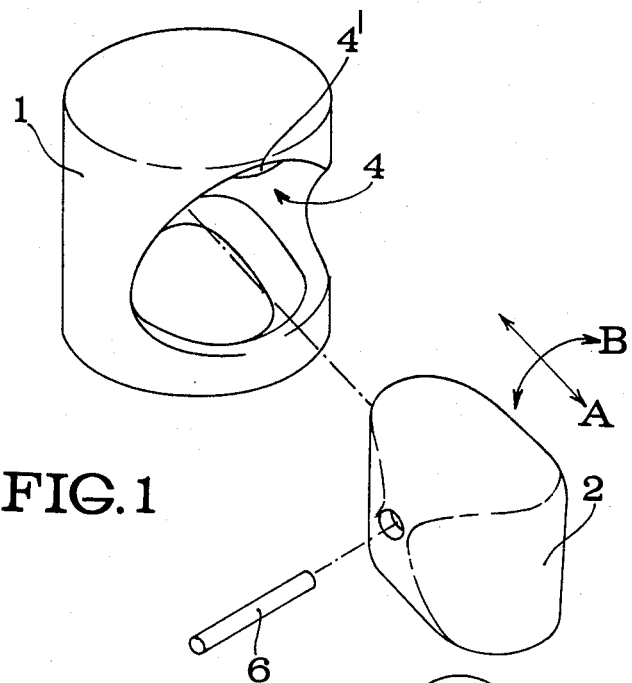
FIG. 1 is a perspective exploded view of a first embodiment of a joint according to the invention.
Figure 2:
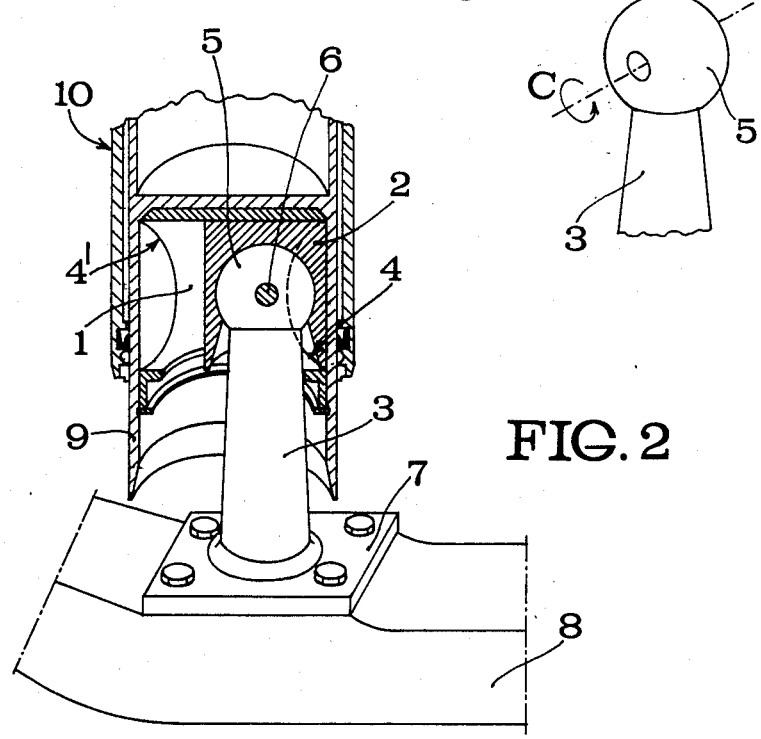
FIG. 2 is a perspective view, partly in section, of the joint of FIG. 1, connected to an axle and a vertically movable suspension.

Referring to FIGS. 1 and 2, a rotary translating joint according to the invention comprises a hollow cylindrical casing 1 which is open at the base and provided with at least one aperture 4, preferably two opposed apertures 4 and 4', on the cylindrical surface. Accommodated within the casing 1 is a hollow sleeve 2 which is likewise downwardly open and formed by a solid body obtained by the intersection of two perpendicular cylinders capable of making rotary translating movements. In fact, the sleeve 2 can translate along the axis of the aperture 4, 4', i.e. in the direction of the arrow A in FIG. 1, and can rotate around this axis, i.e. in the direction of the arrow B in FIG. 1. Fixed in the interior of the sleeve 2 by means of a gudgeon 6 is the spherical head 5 of a pin 3 which can rotate around the axis of the gudgeon as shown by the arrow C in FIG. 1. The pin 3 projects from the open bases of the sleeve 2 and of the casing 1 and is fixed by means of a plate 7 to an axle 8 of a vehicle. On the other hand, the cylindrical casing 1 is secured to the lower end of an inner jacket 9 of a suspension element 10 capable of moving vertically, for example, air spring, mechanical spring, hydraulic air spring or mixed type spring.

The joint according to the first embodiment of the invention, described above, permits the vertically movable suspension 10 to be pivotally connected to the axle 8. Whereas in the theoretical case of relative motion between the axle 8 and the chassis of the vehicle (not shown) in an exactly vertical direction, the joint according to the invention does not perform any inner movement, as such vertical motion is completely absorbed by the suspension 10, in the case of relative motion between the axle and the chassis with components in a direction different from the vertical, the joint operates and can carry out the following movements:

(a) a rotation of the spherical head 5 of the pin 3 around the axis of the gudgeon 6, i.e. in the direction of the arrow C in FIG. 1, within the sleeve 2;

(b) a rotation of the pin and sleeve firmly connected by the gudgeon 6 around the axis of the apertures 4, 4', i.e. in the direction of the arrow B in FIG. 1, within the cylindrical casing 1;

(c) a movement of the sleeve 2 along the axis of the apertures 4, 4', i.e. in the direction of the arrow A in FIG. 1, within the cylindrical casing 1.

Thus, there are two possibilities of rotary movement and one possibility of translating movement, so that the joint permits a transverse movement of the axle 8 relative to the inner jacket 9 of the suspension 10 and a rotation of the axle 8 relative to a transverse axis and relative to a longitudinal axis and further permits to absorb the longitudinal thrust, particularly the thrust resulting from the braking torque, so that the system of rods and bars, which has been conventionally used for this purpose, can be simplified, as will be discussed in detail hereinafter.

Figure 3:
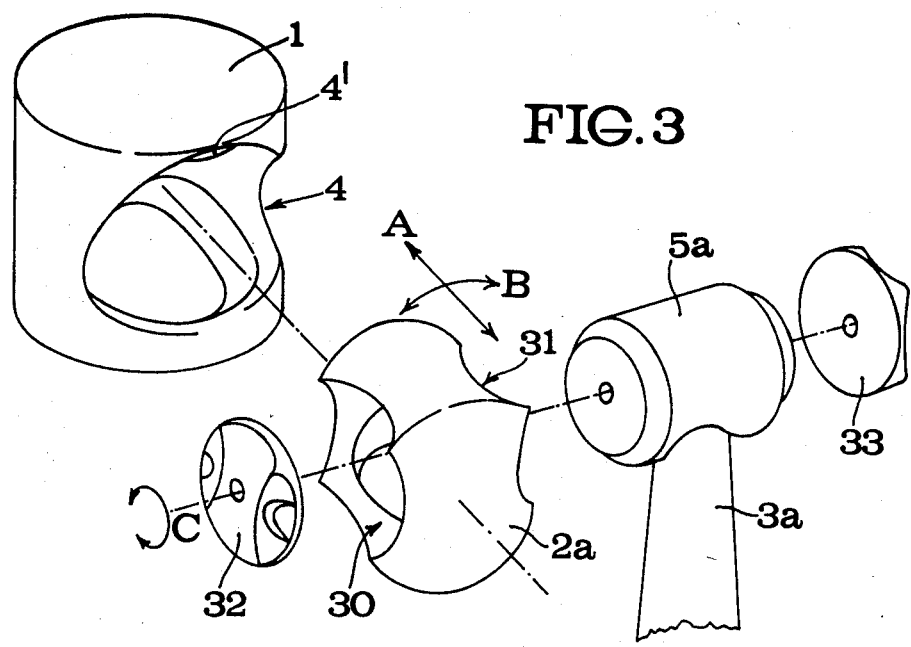
FIG. 3 is a perspective exploded view of a second embodiment of the joint according to the invention.
Figures 4, 5:
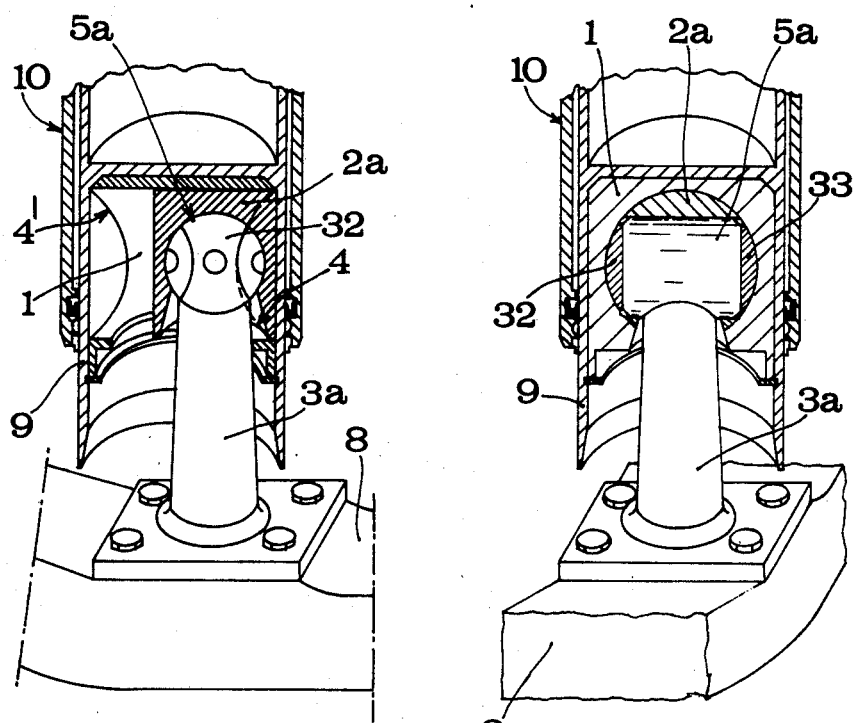
FIG. 4 is a perspective view, partly in transverse section, of the joint of FIG. 3, connected to an axle and a vertically movable suspension.
FIG. 5 is a perspective view, partly in longitudinal section, of the joint of FIG. 3, connected to an axle and a vertically movable suspension.

FIGS. 3, 4 and 5 illustrate a second embodiment of the joint according to the invention which operates substantially in the same manner as the joint illustrated in FIGS. 1 and 2.

In this second embodiment, a pin 3a provided with a cylindrical head 5a is accommodated in a hollow sleeve 2a which, in addition to being open downwardly, is provided with two lateral apertures 30 and 31 on its cylindrical surface, these apertures being closed by disks 32 and 33 adapted to permit only the rotation of the cylindrical head 5a in the interior of the sleeve 2a.

The assembly comprising pin 3a, sleeve 2a and disks 32, 33 is inserted in the cylinder 1 described above, so as to form a joint capable of performing the same movements as indicated by the arrows A, B and C mentioned above.

FIGS. 4 and 5 illustrate the joint of FIG. 3, connected to axle 8 and suspension 10, in a transverse and longitudinal section, respectively.

FIGS. 6 and 7 illustrate a third embodiment of the joint according to the invention.

This joint is again formed of a hollow cylindrical casing 11 which is open at the base and provided with at least one aperture 14, preferably two opposed apertures 14 and 14', on its cylindrical surface. Accommodated in the casing 11 is a hollow sleeve 12 having the same shape as the sleeve 2a described above and provided with three apertures 16, 16' and 16" on its cylindrical surface, which are capable of making rotary translating movements. The sleeve 12 is accommodated in the casing 11 in such a manner that its axis will coincide with the axis of the apertures 14, 14'. Thus, it can translate along this axis, i.e. in the direction of the arrow A in FIG. 6, and can rotate around this axis, as indicated by the arrow B in FIG. 6. The cylindrical head 15 of a pin 13 is accommodated in the interior of the sleeve 12 coaxially with the axis of the apertures 16', 16" in sleeve 12. The pin 13 projects from the lower aperture 16 of sleeve 12 and from the base of the cylindrical casing 11. The head 15 which is firmly secured to pin 13 can translate within sleeve 12 along its axis, i.e. in the direction of the arrow D in FIG. 6, and can rotate around this axis in the direction of the arrow C in FIG. 6. This translation in the direction of the arrow D is possible because the height of the cylindrical head 15 is smaller than the dimension of the cavity in sleeve 12.

In the same manner as described with reference to the preceding Figures, the pin 13 is secured to an axle 18 and the cylindrical casing 11 is fixedly mounted at the lower end of an inner jacket 19 of a vertically movable resilient suspension element 20.

The joint according to the third embodiment described with reference to FIGS. 6 and 7 can thus make the following movements:

(a) a translation of the cylindrical head 15 of the pin 13 along its axis, i.e. in the direction of the arrow D in FIG. 6, within the hollow sleeve 12;

(b) a rotation of the cylindrical head 15 of the pin 13 around its axis, i.e. in the direction of the arrow C in FIG. 6, within the sleeve 12;

(c) a translation of the sleeve 12 along its axis, i.e. in the direction of the arrow A in FIG. 6, within the cylindrical casing 11;

(d) a rotation of the sleeve 12 around its axis, i.e. in the direction of the arrow B in FIG. 6, within the cylindrical casing 11.

Thus, there are two possibilities of rotary movement and two possibilities of translating movement and by virtue of these movements the joint provides an articulated connection between the axle and the vertically movable suspension so as to permit the longitudinal and transverse movement of the axle 18 relative to the inner jacket 19 of the suspension 20 and the rotation of the axle 18 relative to a transverse axis and a longitudinal axis.

FIG. 8 illustrates a fourth embodiment of the joint according to the invention for connection between an axle and a suspension. Mounted at the base of an inner jacket 39 of a suspension 40 is a cylindrical body 41 which is downwardly open and provided with a central spherical cavity accommodating a spherical head of a pin 43. The pin 43 is secured to a forked element 37 which is rotatable on a pin 36 of an axle 38.

As this joint is capable of rotation both by virtue of the spherical head of the pin 43 (arrow A in FIG. 8) and by virtue of the fork 37 on the pin 36 (arrow B in FIG. 8), the axle 38 can perform the rotary and translating movements relative to the jacket 39 of the suspension 40, which are required for its correct operation.

Figure 9:
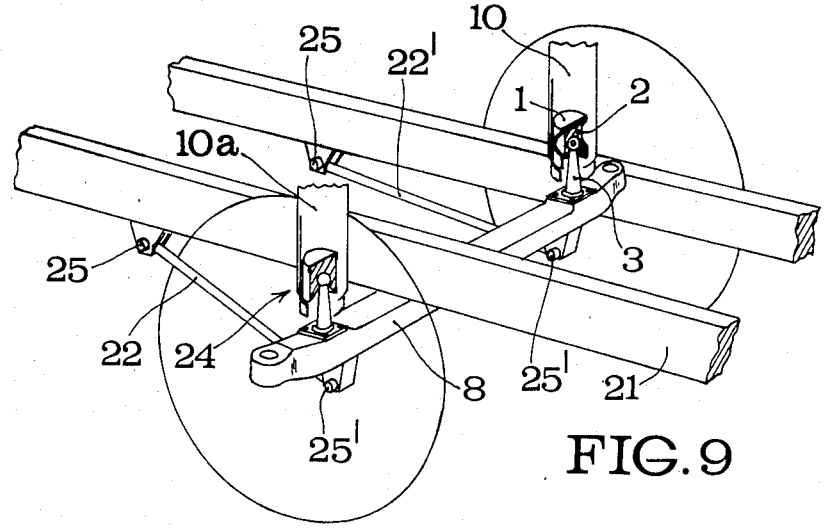
FIGS. 9 and 10 schematically illustrate two anchoring systems for vehicle axles according to the invention.
Figure 10:
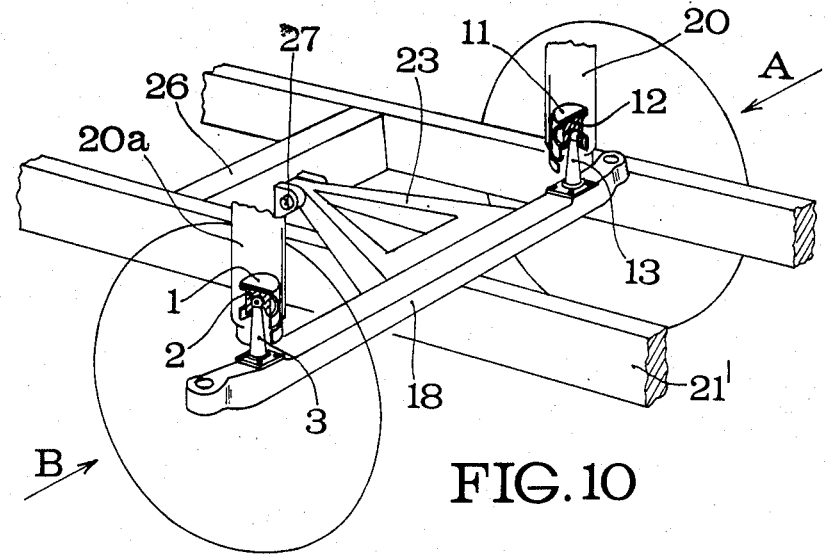

FIGS. 9 and 10 show by way of example two possible embodiments of a system for anchoring rigid axles to the chassis of a vehicle, not shown, using the rotary translating joints described above.

In FIG. 9 the rigid axle 8 is anchored to vertically movable suspensions 10, 10a rigidly secured to a chassis 21 of a vehicle, not shown, by joints of the following types:

a conventional ball joint 24 which connects the axle 8 to a suspension 10a;

a rotary translating joint of the type illustrated in FIGS. 1 and 2 and comprising a pin 3 mounted by means of a sleeve 2 movable along a transverse axis. With such an anchoring system, the combination of the two joints permits the axle to carry out the movements required for its correct operation and described above; further, a conventional ball joint 24 permits to absorb the transverse thrust. Both joints together with rods 22, 22' connected by ball joints 25, 25' to the chassis and the axle, respectively, permit to absorb the longitudinal thrust, particularly the thrust resulting from the braking torque.

In FIG. 10 a rigid axle 18 is anchored to vertically movable suspensions 20, 20a rigidly secured to a chassis 21' of a vehicle, not shown, by means of joints of the following types:

a rotary translating joint of the type illustrated in FIGS. 1 and 2 and comprising a pin 3 accommodated in a sleeve 2 movable in a cylinder 1 at the base of the suspension 20a, the cylinder being mounted by means of the sleeve 2 which movable along a longitudinally axis;

a rotary translating joint of the type illustrated in FIGS. 6 and 7 and comprising a pin 13 accommodated in a sleeve 12 movable in a cylinder 11 located at the base of the suspension 20 and mounted by means of a sleeve 12 movable along a transverse axle. In such an anchoring system, the combination of the two joints permits the axle to carry out the movements required for its correct operation and described above. Further, the rotary translating joint with the spherical head as shown in FIGS. 1 and 2 reacts to transverse thrust. On the other hand, the absorption of the longitudinal thrust and the braking torque is obtained by a triangular drawbar 23 having its base firmly connected to the axle 18 and the top connected by a ball joint 27 to a transverse beam 26 of the chassis.

Figure 11:
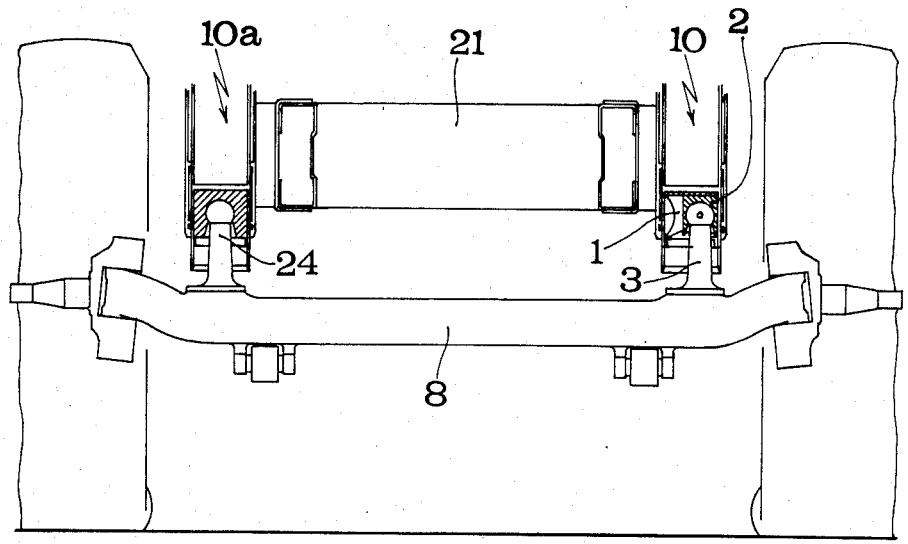
FIGS. 11 and 12 schematically illustrate, in part sectional front views, the suspension system of the axle of FIG. 9 in two different operating positions.
Figure 12:
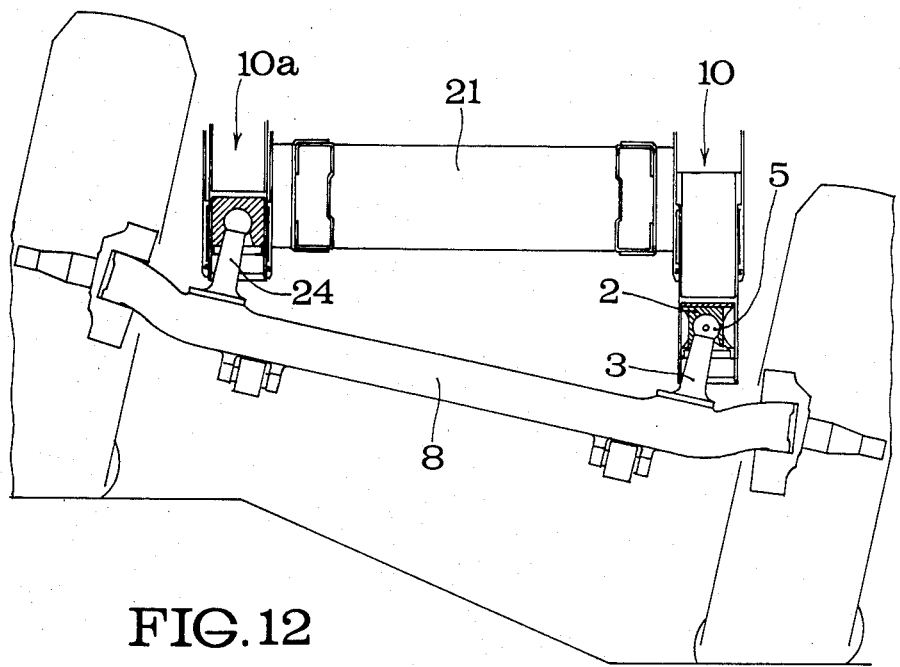

Whereas FIG. 11 illustrates the suspension system of FIG. 9 on horizontal ground, FIG. 12 illustrates it in the case of driving on uneven ground, particularly in a case wherein the right-hand wheel drops into a hole or the left-hand wheel rises onto a cat's back. In such a situation, the axle 8 tilts and the spherical head of the pin 24 rotates as it is free only to make a rotary movement, whereas the suspension 10 undergoes an elongation and the center of the spherical head 5 of the pin 3 describes an arc of circle relative to the axis of the suspension. This causes a rotation of the head 5 around the axis of the gudgeon 6 (arrow C in FIG. 1) and a translation made possible by the movement of the sleeve 2 within the casing 1 (arrow A in FIG. 1).

The combination of a joint with a conventional spherical head and a rotary translating joint with a pin having a spherical head according to the invention ensures the absorption of the transverse thrust and permits the axle to rotate relative to the longitudinal axis passing through the center of the spherical head of the pin 24. With regard to the longitudinal thrust, the behavior of the joint according to the invention is illustrated in FIGS. 13 and 14 which show the vehicle in a situation of normal driving in the direction of the arrow A and the vehicle in a situation of braking, respectively.

To react to longitudinal thrust, here exemplified by the case of braking, it is only necessary to adopt two articulated rods 22, 22' (cf. also FIG. 9), which simplifies the system of separate members of the conventional suspension used.

Figure 13:
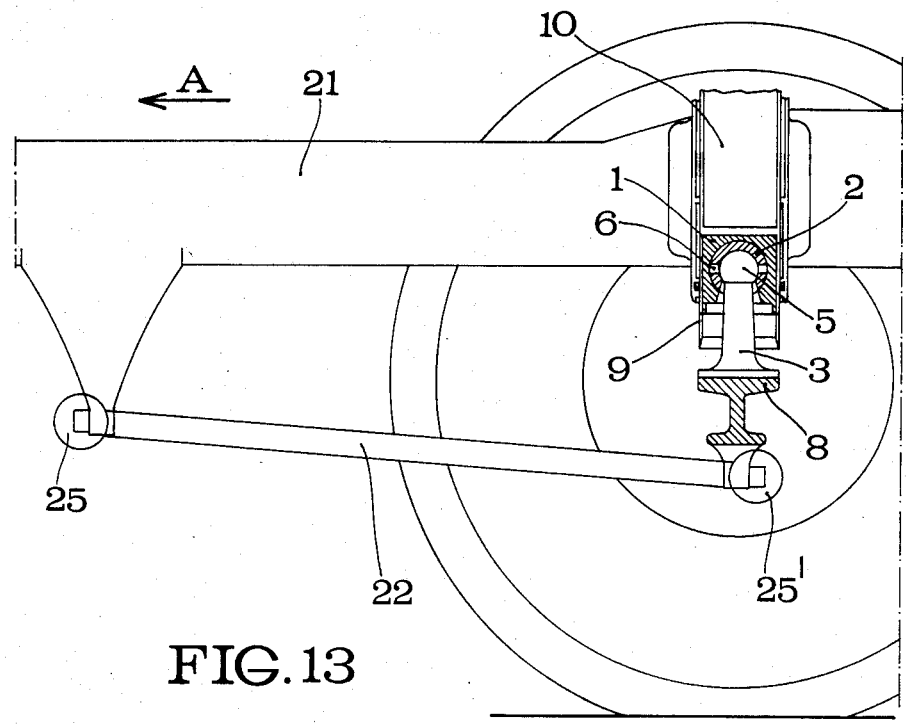
FIGS. 13 and 14 schematically illustrate, in part sectional side views, a portion of the axle suspension system of FIG. 9 in two different operating positions.
Figure 14:
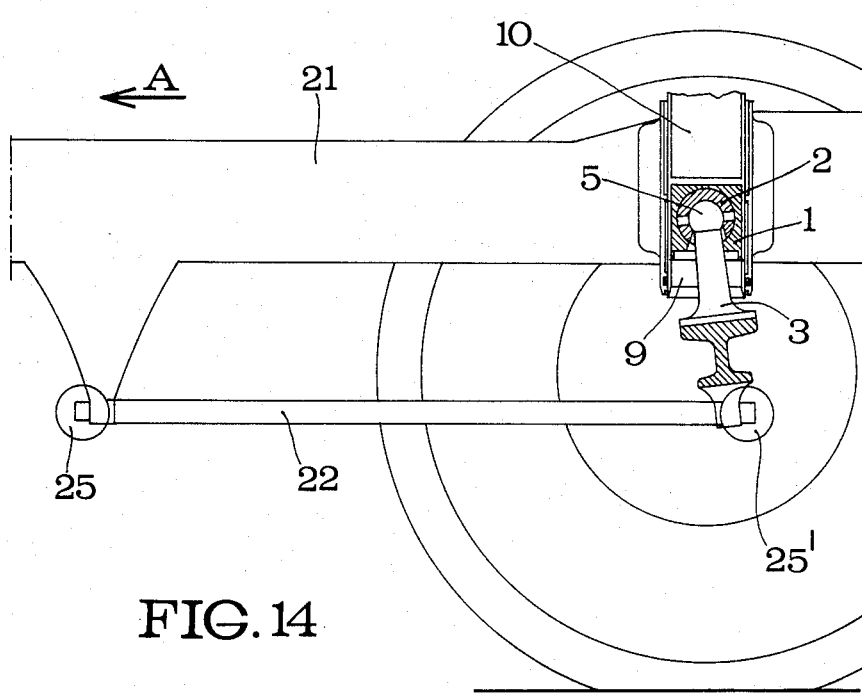

With respect to the condition of normal driving of FIG. 13, in the case of braking with transmission of load to the axle, the inner jacket 9 of the suspension 10 is lifted. The rod 22 makes an upward rotation around the joint 25 as a center, which rotation is transmitted through the joint 25' to the pin 3 of the joint and causes a joint rotation of the head 5 and of the sleeve 2 within the casing 1 (arrow B in FIG. 1).

The combination of the two joints described above with two articulated rods 22, 22' ensures the absorption of the longitudinal thrust, in particular the thrust resulting from the braking torque, and permits the axle to rotate relative to the joint 25.

It is to be understood that in the application described above the joint having the pin 3 with the spherical head 5 can be replaced by the pin 3a with the cylindrical head 5a shown in FIGS. 3, 4 and 5.

Figure 15:
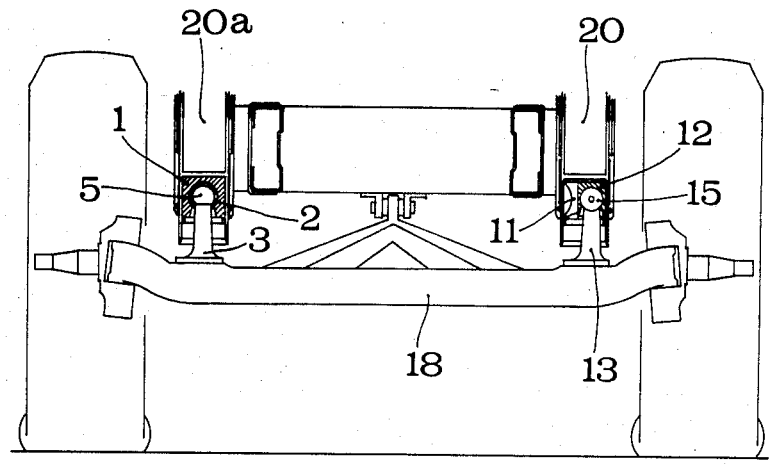
FIGS. 15 and 16 schematically illustrate, in part sectional front views, the axle suspension system of FIG. 10 in two different operating positions.

FIG. 15 illustrates in a rear view the system for anchoring the axle 18 shown in FIG. 10 in the case of even ground.

Figure 16:
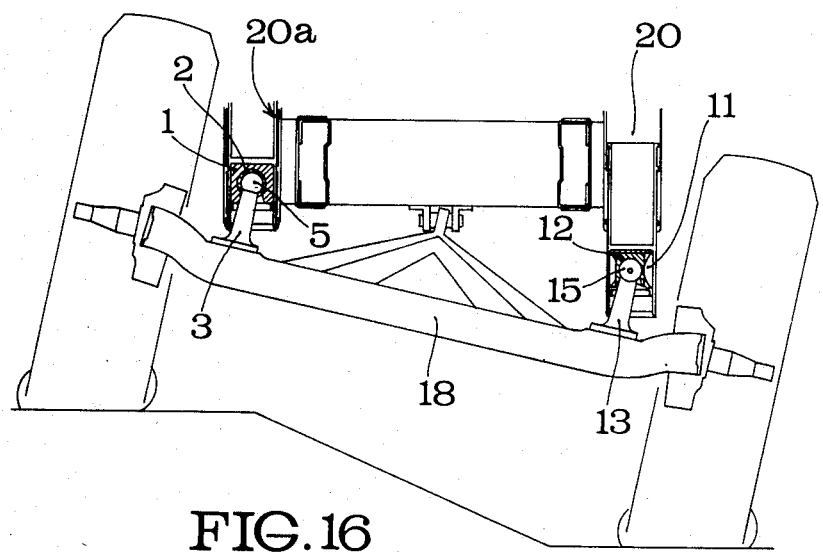

On the other hand, FIG. 16 illustrates the behavior of the above-mentioned system in the case of driving on uneven ground, particularly in a case in which the right-hand wheel drops into a hole or the left-hand wheel rises onto a cat's back. In the same manner as described with reference to FIG. 12, the axle 18 tilts and the suspension 20 undergoes an elongation. While the pin 3 is inclined, too, causing a simultaneous rotation of the head 5 and the sleeve 2 within the cylindrical casing 1 (arrow B in FIG. 1), the center of the cylindrical head 15 of the pin 13 moves along an arc of circle relative to the axis of the suspension, which causes a rotation of the cylindrical head 15 around its axis (arrow C in FIG. 6) and a translation of the same head, made possible by the movement of the sleeve 12 within the casing 11 (arrow A in FIG. 6).

The combination of a rotary translating joint having a pin with a spherical head with a rotary translating joint having a pin with a cylindrical head, according to the invention, thus ensures the absorption of the transverse thrust and permits the axle to rotate relative to the longitudinal axis passing through the center of the spherical head of the pin 3.

Figure 17:
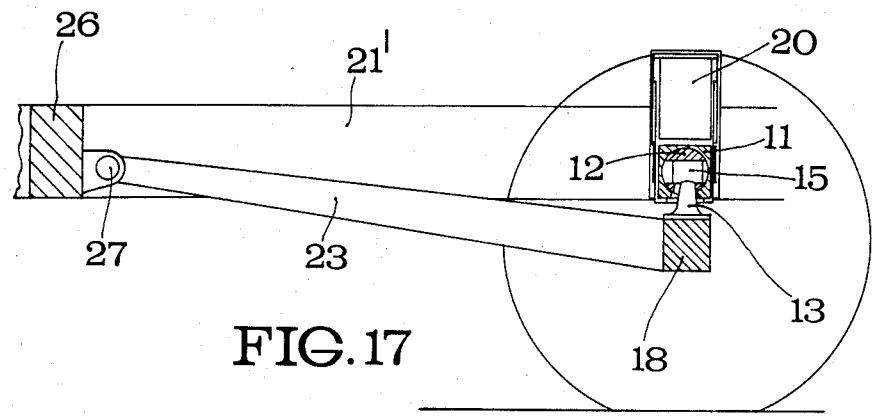
FIGS. 17 and 18 schematically illustrate, in side views in the direction of the arrow A in FIG. 10, a portion of the axle suspension system in two different operating positions.
Figure 18:
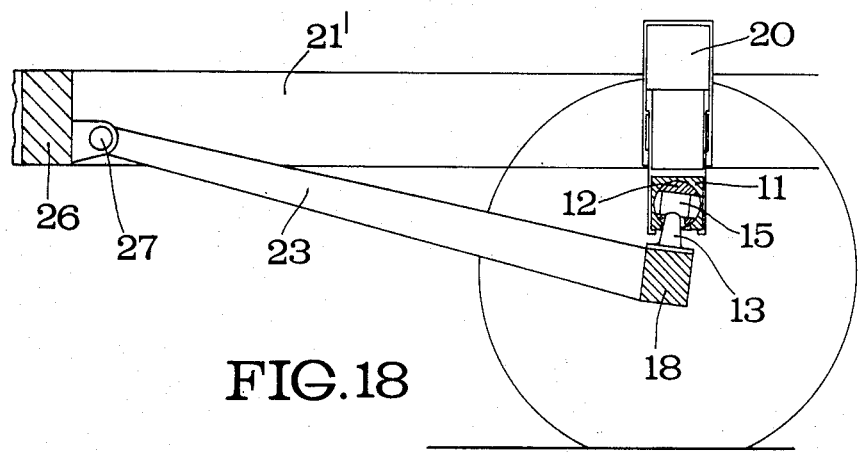

FIGS. 17 and 18 illustrate the behavior of the anchoring system having a rotary translating joint with a cylindrical head in the direction of the arrow A in FIG. 10 in the case of normal driving and driving with thrust acting in the longitudinal direction, taking as an example the case of braking.

In this system it is contemplated to use a separate connection member between the axle 18 and a transverse beam 26 of the chassis formed by a triangular drawbar 23 rigidly secured to the axle and pivotally connected by means of a ball joint 27 to the transverse beam 26 of the chassis of the vehicle.

With regard to the situation of normal driving shown in FIG. 17, in case of braking and consequent lifting of the chassis relative to the axle there occurs an elongation of the suspension and a rotation of the drawbar 23 (FIG. 18) around the ball joint 27. This rotation is rigidly transmitted to the pin 13 of the joint and causes both a joint rotation of the cylindrical head 15 of the pin 13 and of the sleeve 12 within the cylindrical casing 11 (arrow B in FIG. 6), and a simultaneous translation of the cylindrical head 15 within the sleeve 12 (arrow D in FIG. 6).

Figure 19:
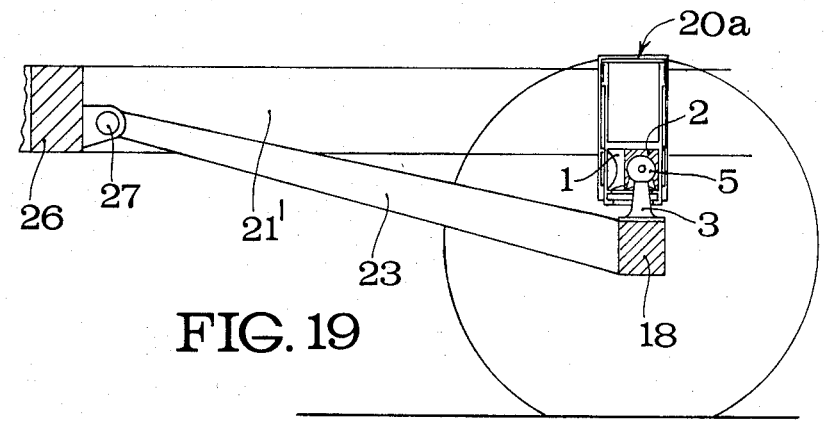
FIGS. 19 and 20 schematically illustrate, in side views in the direction of the arrow B in FIG. 10, a portion of the axle suspension system in the same operating positions as in FIGS. 17 and 18.
Figure 20:
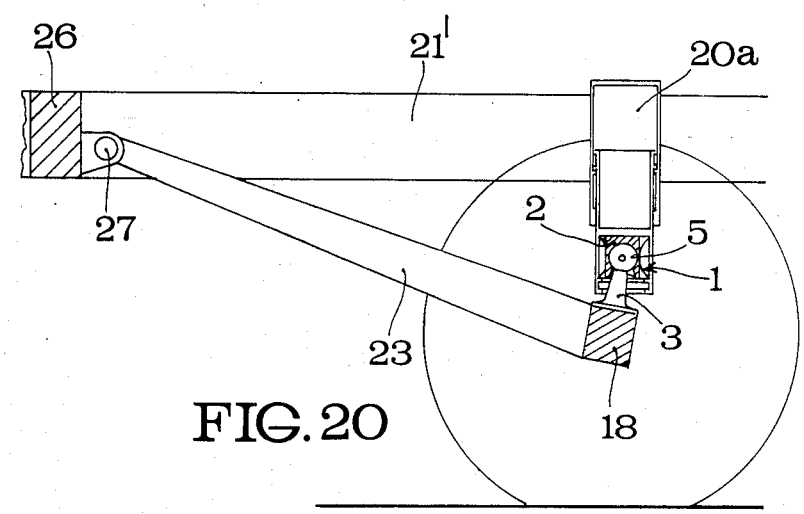

The behavior of the rotary translating joint having the pin 3 with the spherical head 5, which connects suspension 20a to axle 18, is illustrated in FIGS. 19 and 20 which are views in the direction of the arrow B in FIG. 10.

With regard to the situation of normal driving of FIG. 19, the braking exemplified in FIG. 20 causes a lifting of the chassis relative to the axle 18 with an elongation of the suspension 20a and a rotation of the drawbar 23 (FIG. 20) around the ball joint 27. This rotation is rigidly transmitted to the pin 3 of the rotary translating joint and produces both a rotation of the spherical head 5 within sleeve 2 (arrow C in FIG. 1), and a simultaneous translation of sleeve 2 within the cylindrical casing 1 (arrow A in FIG. 1).

The combination of the two joints described above with a triangular drawbar having its base firmly connected to the axle permits the axle to rotate relative to the transverse axis passing through the center of the joint 27 and ensures the absorption of the longitudinal thrust, in particular the thrust resulting from the braking torque.

From the given examples it is therefore clear that by using the axle anchoring system according to the invention it is only necessary to provide separate connection elements between the axle and the chassis of the vehicle, which are constituted either by a pair of articulated rods or by a triangular drawbar, with a considerable reduction of the number of the members used conventionally. This affords the advantages recited above, namely smaller overall dimensions and weight, ease of mounting and reduced production and running costs.

Although some preferred embodiments of the invention have thus been described in detail and illustrated in the accompanying drawings, it is to be understood that the invention is not limited to these precise embodiments and that numerous changes and modifications may be made therein without departing from the scope of the invention as defined by the appended claims.

I claim:

1. An anchoring system for vehicle axles having vertically movable suspensions rigidly secured to a chassis of the vehcile, comprising
connection elements arranged between a rigid axle and the chassis of the vehicle, to react to longitudinal thrust and braking torque;
at least one vertically movable suspension connected to said rigid axle and said chassis;
joint means inserted between said vertically movable suspension and said rigid axle for connection therebetween, said joint means comprising a hollow cylindrical casing secured to a lower end of said suspension and provided with at least one aperture, a rotary translating sleeve in said aperture and accommodated in said cylindrical casing for rotary translating movements, and a pin seucred to said axle and having a head rotatably accommodated in said sleeve.

2. An achoring system for vehicle axles as claimed in claim 1, wherein said head of said pin is spherical and is connected to said sleeve by means of a gudgeon extending perpendicularly to the axis of said aperture in said hollow cylindrical casing.

3. An anchoring system for vehicle axles as claimed in claim 1, wherein said head of said pin is cylindrical and is retained in said sleeve by disks inserted in lateral aperture in said sleeve.

4. An anchoring system for vehicle axles as claimed in claim 1, wherein said head of said pin is cylindrical and is movable along its axis in the interior of said sleeve.

5. An anchoring system for vehicle axles as claimed in claim 1, wherein said rigid axle is connected to two suspensions, a first connection being by way of a ball joint pin and a second by way of said joint means, said pin having a spherical head received in said sleeve.

6. An anchoring system for vehicle axles as claimed in claim 1, wherein said rigid axle is connected to two suspensions, a first connection being by way of a rotary translating joint having a spherical head received in a longitudinally movable sleeve and a second by way of a rotary translating joint having a cylindrical head movable longitudinally in a sleeve movable transversely.

7. An anchoring system for vehicle axles as claimed in claim 1, wherein said at least one vertically movable suspension is connected to said rigid axle by at least one joint comprising a hollow cylindrical body mounted at the base of said suspension and accommodating a spherical head of said pin which is secured to a forked member rotatably mounted on a further pin on said rigid axle, said first-named pin and said further pin being oriented substantially perpendicularly to each other.

8. An anchoring means for vehicles having a rigid axle and at least one suspension rigidly secured to a chassis of said vehicle, said rigidly fixed suspension comprising a tubular part having a fixed predetermined axis and containing a hollow jacket coaxially arranged within said tubular part, a joint in form of a hollow cylindrical body mounted within a base portion of said hollow jacket and including a hollow sleeve within said hollow body, and pin means fixed at one of its ends to said axle and having an opposite end received in said hollow sleeve whereby on subjecting said vehicle to longitudinal thrust and braking torque said joint, for various positions of said axle is moved within the confines of said hollow jacket which in turn is movable relative to said tubular part along said predetermined axis.

9. An anchroing system for vehcile axles having vertically movable suspensions rigidly secured to a chassis of the vehicle, comprising connection elements arranged between a rigid axle and the chassis of the vehicle, to react to longitudinal thrust and braking torque; at least one vertically movable suspension connected to said rigid axle and said chassis; a joint inserted between said vertically movable suspension and said rigid axle for connection therebetween, said joint comprising a rotatable pin and a rotary translating sleeve accommodated in a cylindrical seat at the base of said suspension and coupled to said rotatable pin, said rigid axle being connected to two suspensions a first connection being by way of a rotary translating joint having a spherical head received in a longitudinally movable sleeve and a second by way of a rotary translating joint having a cylindrical head movable longitudinally in a sleeve movable transversely.

* * * * *